(12) United States Patent
Reese et al.

(10) Patent No.: US 12,515,544 B2
(45) Date of Patent: Jan. 6, 2026

(54) LIGHT PIPE APPARATUS AND ASSOCIATED ELECTRONIC DEVICE

(71) Applicant: EATON INTELLIGENT POWER LIMITED, Dublin (IE)

(72) Inventors: Robert J. Reese, Edwardsville, IL (US); Gora Goswami, Kolkata (IN); Dominic Kurian Mathew, Bengaluru (IN); Mark F. Zanella, Beaver, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 673 days.

(21) Appl. No.: 17/389,859

(22) Filed: Jul. 30, 2021

(65) Prior Publication Data

US 2023/0034331 A1 Feb. 2, 2023

(51) Int. Cl.
*H01R 13/641* (2006.01)
*B60L 53/16* (2019.01)
*H01R 13/717* (2006.01)

(52) U.S. Cl.
CPC ............ *B60L 53/16* (2019.02); *H01R 13/641* (2013.01); *H01R 13/7175* (2013.01); *H01R 2201/26* (2013.01)

(58) Field of Classification Search
CPC ..... B60L 53/16; G02B 6/4207; G02B 6/0081; G02B 6/4201; H01R 13/7175; H01R 2201/26
See application file for complete search history.

(56) References Cited

U.S. PATENT DOCUMENTS

| 10,647,207 B2 | 5/2020 | Rivas et al. |
| 2005/0174499 A1* | 8/2005 | Clark .................. G02B 6/0088 349/16 |
| 2006/0208166 A1* | 9/2006 | Ruttiger .................. B60Q 3/64 250/214 AL |
| 2013/0208497 A1* | 8/2013 | Provost ............... F21V 33/0068 362/555 |
| 2014/0213100 A1* | 7/2014 | Xuan .................. H01R 13/7175 439/490 |
| 2015/0212248 A1* | 7/2015 | Yamamoto ............... H04N 5/00 398/180 |

FOREIGN PATENT DOCUMENTS

| CN | 111 326 078 A | 6/2020 |
| CN | 211 149 998 U | 7/2020 |
| JP | 2009 069314 A | 4/2009 |

OTHER PUBLICATIONS

European Patent Office, "International Search Report and Written Opinion" for corresponding International (PCT) Patent Application No. PCT/EP2022/025360, Nov. 21, 2022, 15 pp.

* cited by examiner

*Primary Examiner* — Julian D Huffman
*Assistant Examiner* — Sadia Kousar
(74) *Attorney, Agent, or Firm* — Eckert Seamans Cherin & Mellott, LLC (57) ABSTRACT

An electronic device and a light pipe apparatus advantageously are formed of a relatively small number of components that are configured to provide various types of light at the exterior of the electronic device while detecting ambient light at the exterior of electronic device, while also providing weather seals that protect the interior of electronic device without requiring the use of additional components to provide such seals.

18 Claims, 10 Drawing Sheets

LIGHT PIPE APPARATUS AND ASSOCIATED ELECTRONIC DEVICE

BACKGROUND

Field

The disclosed concept relates generally to an electronic device and an associated light pipe apparatus and, more particularly, to an electronic device and an associated light pipe apparatus that are usable in a vehicle recharging facility and that detect ambient light and output at least one of other type of light in a dispersed fashion.

Related Art

It is known to employ electronic devices that are connected with a source of electrical power to recharge electric vehicles. Given the unique needs of the vehicle recharging industry, the electronic devices that are used to recharge such electric vehicles need to be usable in numerous types of conditions. They also need to be user-friendly.

While current electronic devices that are used to recharge electric vehicles have been generally effective for their intended purposes, they have not been without limitation. Thus, there is room for improvement in electronic devices, such as those that are used to recharge electric vehicles, and other electronic devices.

SUMMARY

These needs and others are met by embodiments of the invention, which are directed to an improved electronic device and light pipe apparatus therefor.

As one aspect of the disclosed and claimed concept, a light pipe apparatus is usable in an electronic device having a housing, the housing having an interior, a number of illumination sources situated within the interior, and a light detector situated within the interior. The light pipe apparatus can be generally stated as including a number of bodies that can be generally stated as including a first body formed as a single piece unit and formed of an at least partially translucent material, the first body can be generally stated as including an indication light pipe that is structured to be situated adjacent the number of illumination sources and to communicate light from the number of illumination sources to an exterior of the housing, the first body can be generally stated as further including a detection light pipe that is structured to communicate light from the exterior of the housing to the light detector, and a support that extends between the indication light pipe and the detection light pipe, the support can be generally stated as including a tortuous illumination path that resists the transmission of light between the first light pipe and the second light pipe.

As employed herein, the expression "a number of" and variations thereof shall refer broadly to any non-zero quantity, including a quantity of one.

As another aspect of the disclosed and claimed concept, electronic device can be generally stated as including a housing having an interior and an exterior, a number of illumination sources situated within the interior, a light detector situated within the interior, a light pipe apparatus that can be generally stated as including a number of bodies, the number of bodies can be generally stated as including a first body formed as a single piece unit and formed of an at least partially translucent material, the first body can be generally stated as including an indication light pipe that is situated adjacent the number of illumination sources and is structured to communicate light from the number of illumination sources to the exterior, the first body can be generally stated as further including a detection light pipe that is structured to communicate light from the exterior of the housing to the light detector, and a support that extends between the indication light pipe and the detection light pipe, the support can be generally stated as including a tortuous illumination path that resists the transmission of light between the first light pipe and the second light pipe.

BRIEF DESCRIPTION OF THE DRAWINGS

A full understanding of the disclosed concept can be gained from the following Description when read in conjunction with the accompanying drawings in which.

DESCRIPTION

Figure 1:
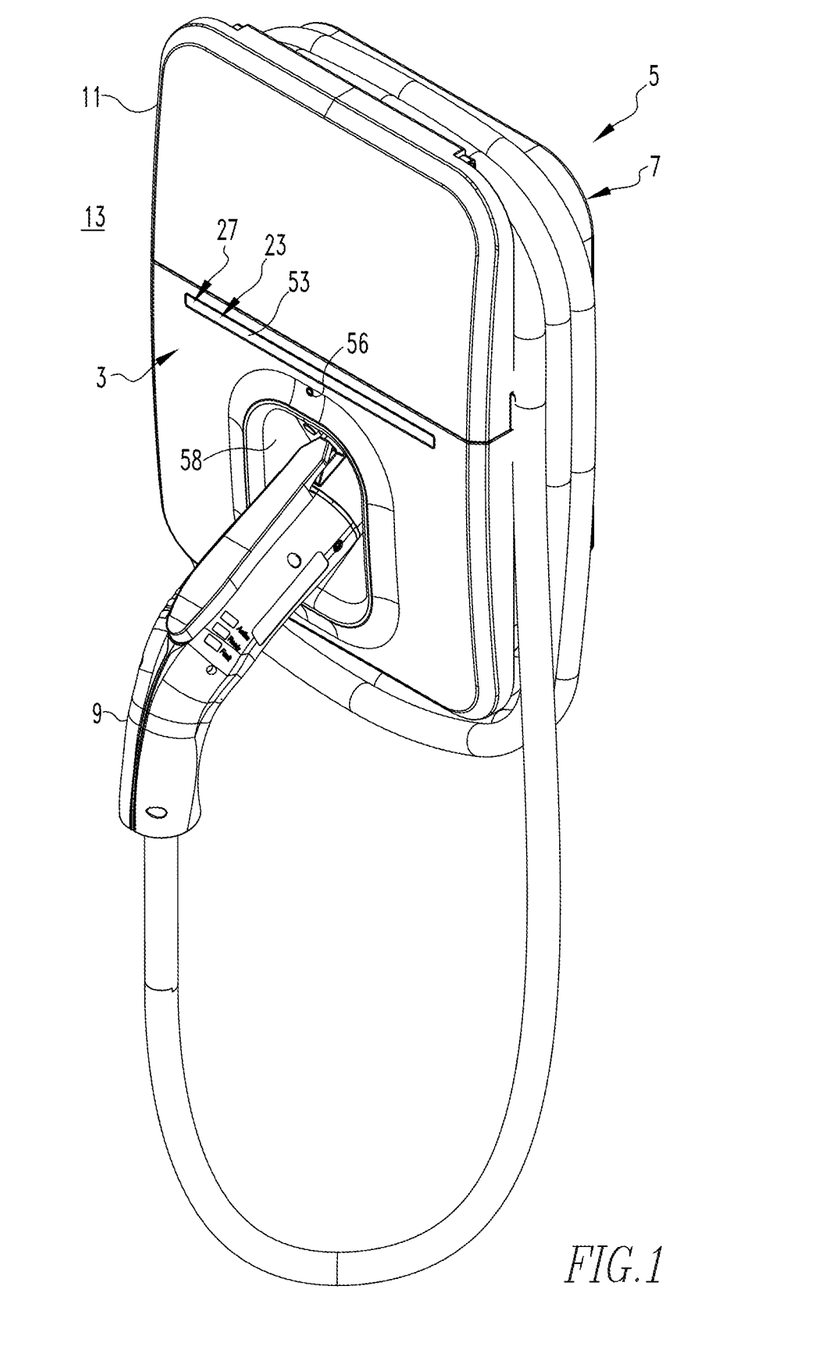
FIG. 1 is a perspective view of an improved electronic device in accordance with the disclosed and claimed concept.
Figure 2:
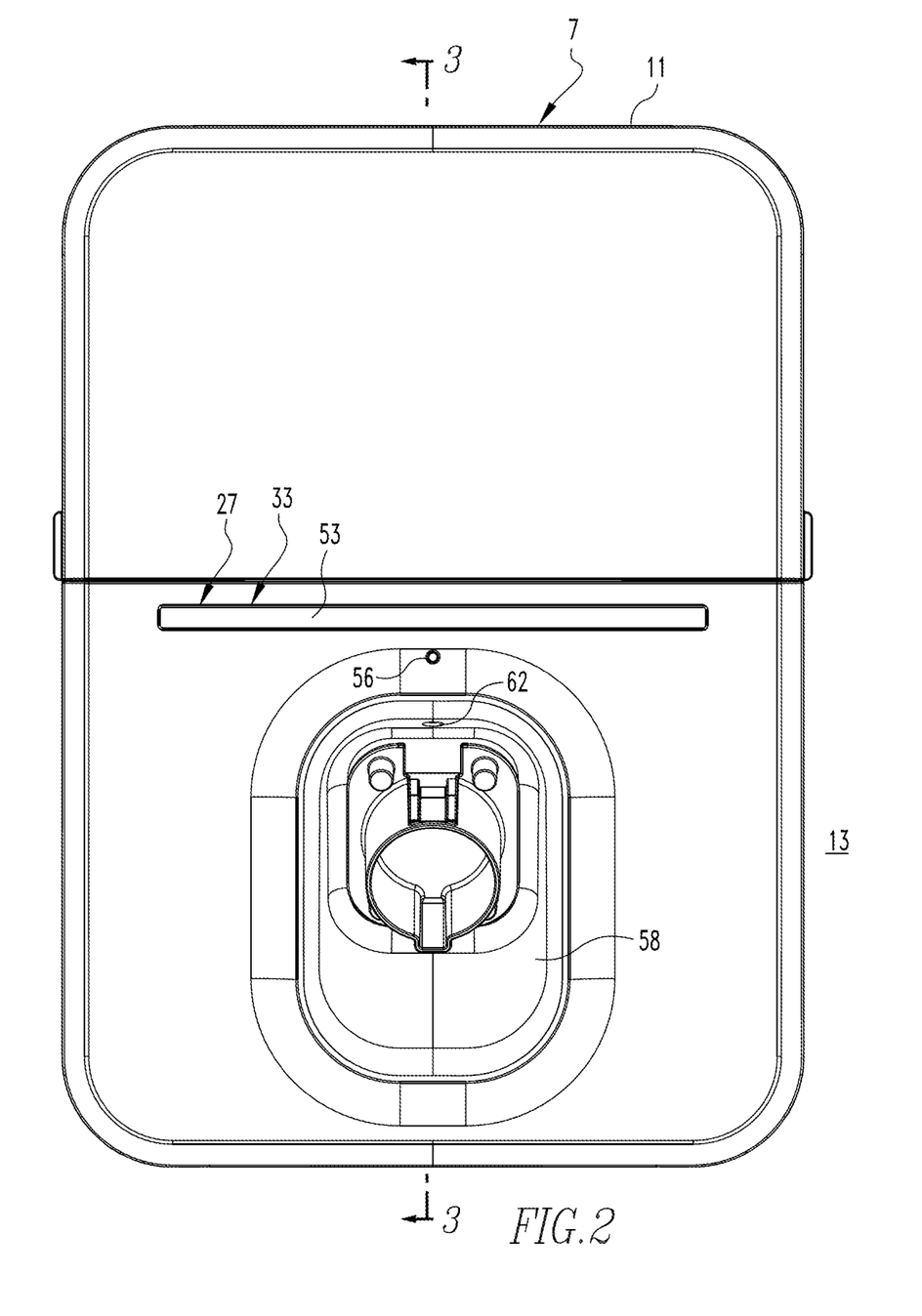
FIG. 2 is a front elevational view of the electronic device of FIG. 1.

An improved electronic device 5 in accordance with the disclosed and claimed concept is depicted generally in FIG. 1. The electronic device 5 includes an improved light pipe apparatus 3 that is depicted generally in FIGS. 3, 6, and 7. The electronic device 5 is electrically connected with a source of electrical power and is usable for recharging electric vehicles and potentially is usable for other purposes. The electronic device 5 includes a main body 7 upon which is situated a charging handle 9 having a flexible cord. The main body 7 includes a housing 11 having an exterior 13 and further having an interior 15 that is depicted in FIGS. 3 and 6 and that is situated opposite the exterior 13.

Figure 3:
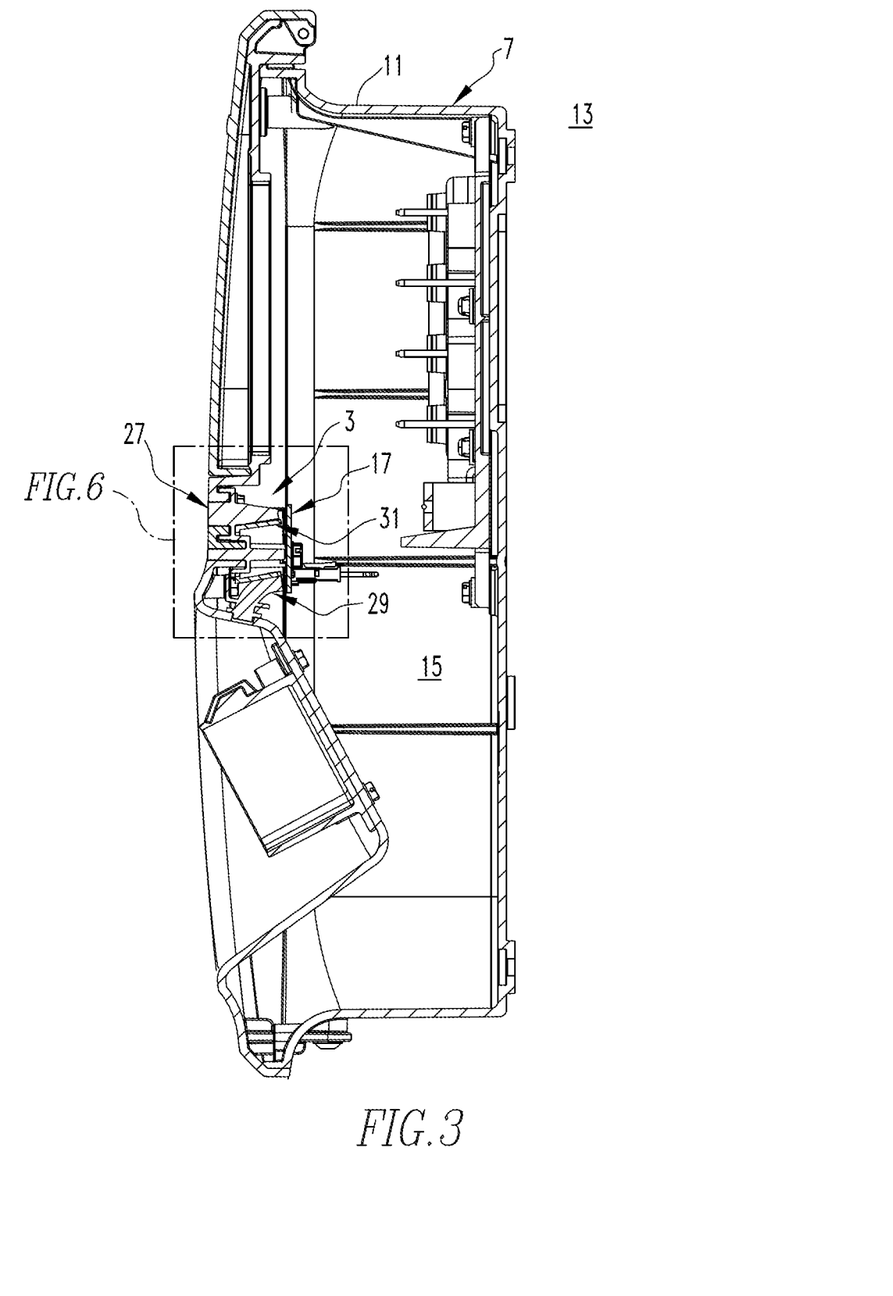
FIG. 3 is a sectional view as taken along line 3-3 of FIG. 2.
Figure 4:
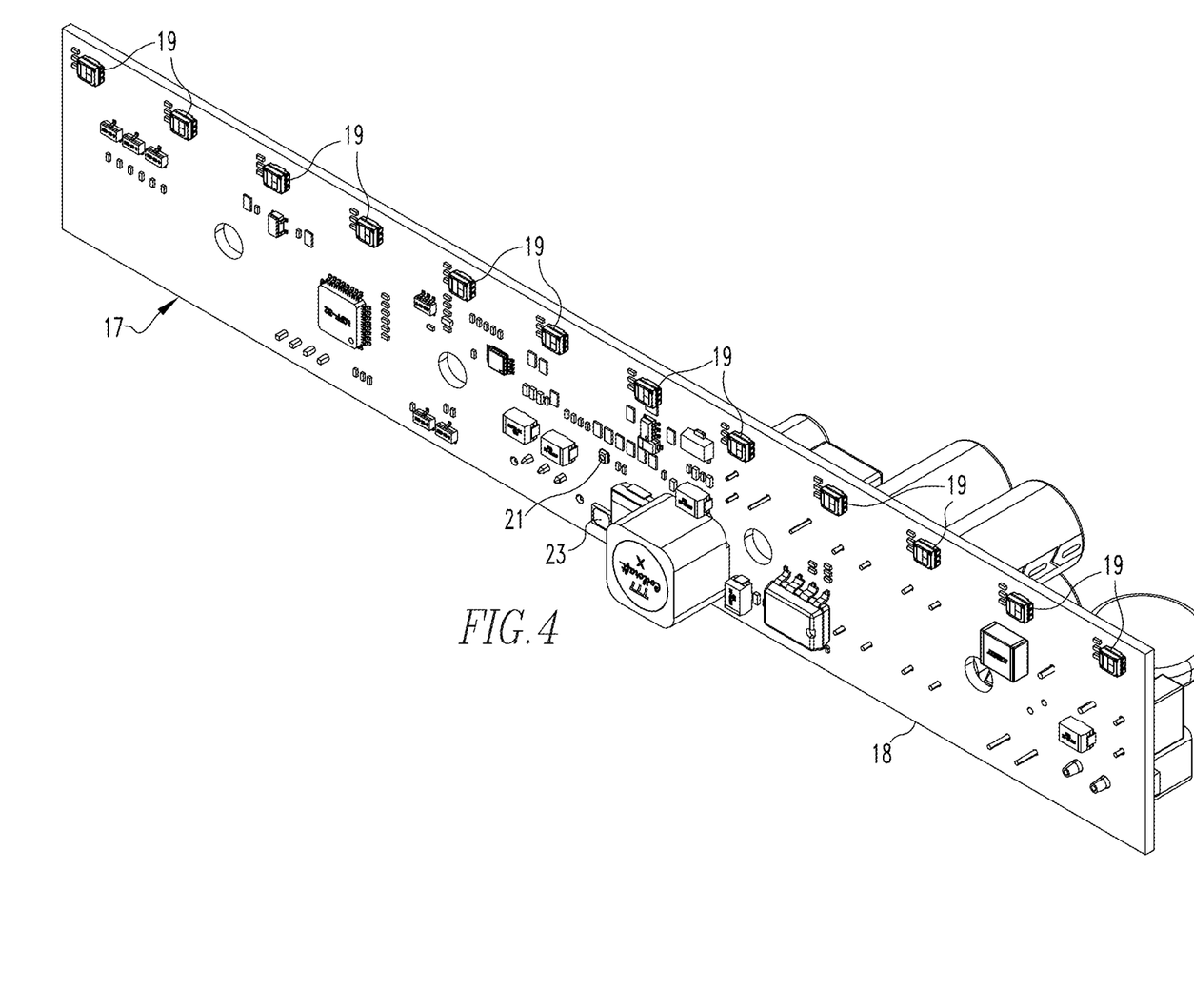
FIG. 4 is a perspective view of a printed circuit board apparatus of the electronic device of FIG. 1.
Figure 5:
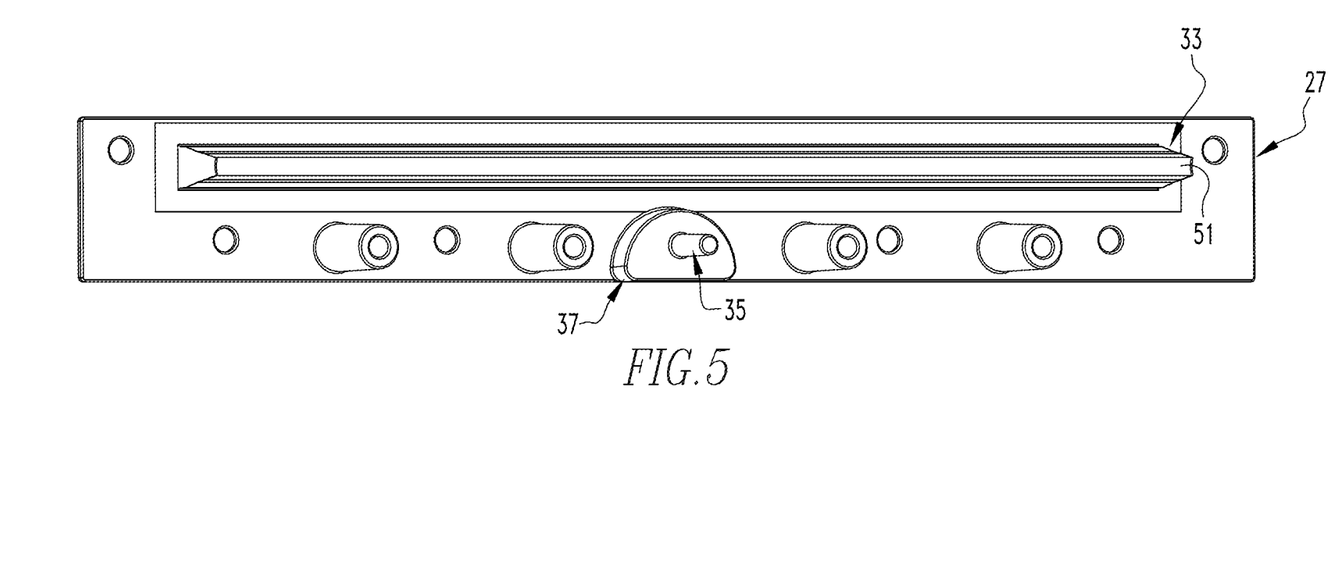
FIG. 5 is a perspective view of a first body of a light pipe apparatus of the electronic device of FIG. 1.
Figure 6:
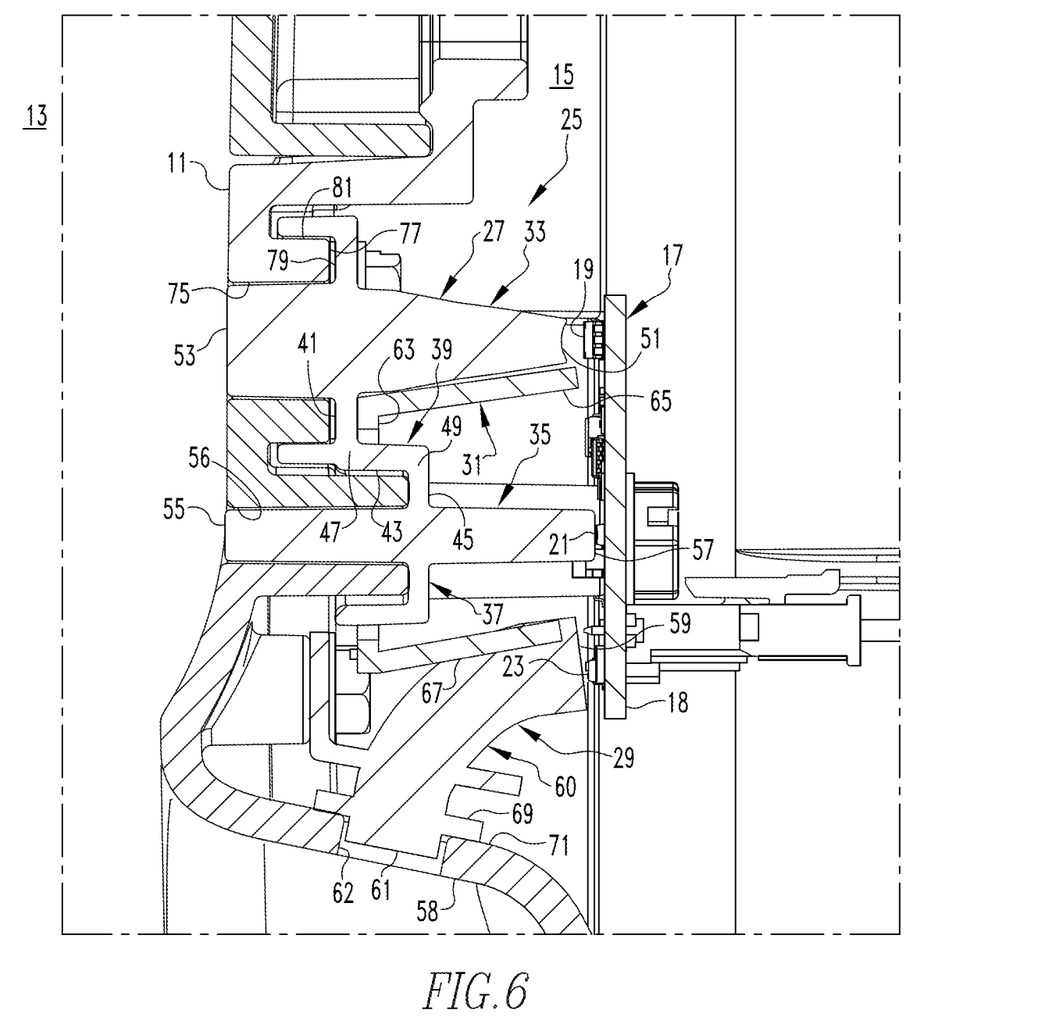
FIG. 6 is an enlargement of an indicated portion of FIG. 3.

The main body 7 further includes a printed circuit board apparatus 17 that is depicted generally in FIG. 4 and is also depicted in FIGS. 3 and 6. The printed circuit board apparatus 17 includes a printed circuit board 18 upon which are mounted a plurality of first illumination sources 19 that are spaced apart from one another along the longer dimension of the printed circuit board 18. The printed circuit board apparatus 17 further includes a light detector 21 and a second illumination source 23 that are mounted to the printed circuit board 18. In the depicted exemplary embodiment, the first illumination sources 19 are LEDs that output colored, i.e., non-white, visible light in colors that might include blue, red, green, and the like without limitation, and they potentially may output white light depending upon the needs of the particular application. The light detector 21 can be any of a wide variety of sensors that detect visible light, such as ambient light. The second illumination source 23 is likewise an LED but it outputs white visible light. It is noted, however that second illumination source 23 can alternatively or additionally other non-white colors and/or a variety of light colors, such as if a user desired purple or another color to suit a specific requirement, and thus many other light colors are equally possible. As will be set forth in greater detail elsewhere herein, the second illumination source 23 provides illumination to a holster area 58 (FIG. 1) at the front of the main body 7 where the charging handle 9 is situated. The printed circuit board apparatus 17 further includes electronics that include, among other electronics, a processor, a storage, and a number of routines that are stored in the storage and that are executable on the processor to cause the electronic device 5 to perform various operations that include recharging an electric vehicle and outputting visual information and visible light via the light pipe apparatus 3.

The light pipe apparatus 3 can be said to include a number of bodies 25 that include a first body 27, a second body 29, and a shield 31. The first body 27 and the second body 29 are each formed as a unitary, single piece structure, and are formed out of a material that is at least partially translucent. The at least partially translucent material from which the first body 27 is formed additionally disperses visible light. For instance, the first body 27 maybe formed from a light dispersive material such as Lexan Copolymer LUX9132C offered by Sabic http://www.sabic.com or other appropriate light dispersive transparent material. The material from which the first body 27 is formed has a Degree of Light Dispersion (DLD), which is the angle at which half of the luminance of the incident light is observed, in the range of about 25°-50°, although other materials having other DLDs outside this range can be employed within the spirit of the instant disclosure. While the second body 29 is formed of an at least partially translucent material, the material need not necessarily be light dispersive.

The shield 31 is formed from a sheet of opaque material that is formed as a unitary, single piece structure and that is situated on the housing. As will be set forth in greater detail below, the shield 31 resists the transmission light in an advantageous and desirable fashion.

As can be understood from FIGS. 5-7 and 10, the first body 27 includes an indication light pipe 33, a detection light pipe 35, and a support 37, all of which are co-formed as a unitary, single piece structure as was noted elsewhere herein. The support 37 is situated on the indication light pipe 33, and the detection light pipe 35 is situated on support 37. Moreover, the first body 27 is configured to additionally include a tortuous illumination path 39 that extends between and is interposed between the indication light pipe 33 and the detection light pipe 35. The tortuous illumination path 39 advantageously resists the transmission of light between the indication light pipe 33 and the detection light pipe 35.

More specifically, and as can be understood from FIG. 6, the first body 27 includes a first leg 41 that extends generally between the indication light pipe 33 and the support 37. The support 37 includes a second leg 43 that extends in a direction generally perpendicular to the first leg 41, and the support 37 further includes a third leg 45 that extends between the second leg 43 and the detection light pipe 35 in a direction that is generally perpendicular to the second leg 43. The tortuous illumination path 39 further includes a first angled connection 47 between the first leg 41 and the second leg 43 and further includes a second angled connection 49 that extends between the second leg 43 and the third leg 45.

The first and second angled connections 47 and 49 advantageously resist the transmission of light between the indication light pipe 33 and the detection light 35 by virtue of the generally perpendicular angles that are formed in the material of the first body 27. That is, whereas the first, second, and third legs 41, 43, and 45 themselves are capable of transmitting light therethrough, the first angle connection 47 that is interposed between the first and second legs 41 and 43 resists the transmission of light between the first leg 41 and the second leg 43 due to simple optics. The light dispersive nature of the material from which the first body 27 is formed further attenuates light transmission between the first and second legs 41 and 43. The same can be said of the second angle connection 49 that is interposed between the second and third legs 43 and 45. As a result, the tortuous illumination path 39 advantageously resists the transmission of light between the indication light pipe 33 and the detection light pipe 35, with the advantageous result that the indication light pipe 33 and the detection light pipe 35 can be co-formed with one another as a unitary, single piece structure, with the tortuous illumination path 39 resisting light pollution between the indication light pipe 33 and the detection light pipe 35.

Such attenuation of light transmission between the indication light pipe 33 and the detection light pipe 35 is desirable and advantageous because the indication light pipe 33 and the detection light pipe 35 perform different functions within the light pipe apparatus 3. More specifically, the indication light pipe 33 includes an inlet end 51 that is elongated and that is situated to extend along the spaced-apart first illumination sources 19. The indication light pipe 33 further includes an outlet end 53 that is likewise elongated and that is situated adjacent the exterior 13 of the housing 11. Light that is output by the first illumination sources 19 is received in the inlet end 51 and, as the light travels from the inlet end 51 toward the outlet end 53, the light is advantageously dispersed by the light dispersive feature of the material from which the first body 27 is formed. The light from the first illumination sources 19 is thus received by the illumination light pipe 33 at its inlet end 51, and such light is transmitted through the illumination light pipe 33 and is dispersed therein and ultimately is visually output from the outlet end 53. Despite the fact that the first illumination sources 19 are spaced apart from one another, the light-dispersing nature of the material from which the first body 27 is formed advantageously results in the outlet end 53 visually outputting a solid bar of light which, in the exemplary embodiment, is colored light. That is, the dispersed lights that is output from the outlet end 53 is in the form of a solid bar of dispersed light that has a warm and friendly appearance and from which it is not readily possible to discern that the solid bar of dispersed light has been generated by a plurality of spaced apart LEDs in the form of the first illumination sources 19. The light-dispersing nature of the indication light pipe 33 thus advantageously enables the use of a relatively smaller quantity of first illumination sources 19 to achieve a solid bar of visible light at the outlet end 53 than would be required in the absence of the indication light pipe 33 having its light-dispersing quality. This advantageously saves expense and complexity, and it provides other benefits by giving the light that is output at the outlet end 53 an overall appearance and impression that is more warm and friendly than would otherwise be possible from non-dispersed LED light alone. The light that is output from the indication light pipe 33 at its outlet end 53 provides a visual indication of charging status, charging availability, problems with charging, etc.

The detection light pipe 35 includes an inlet end 55 that extends through an aperture 56 (FIG. 1) formed in the housing 11 on a front face of the main body 7, and the inlet end 55 is thus adjacent the exterior 13 of the housing 11. The detection light pipe 35 further includes an outlet end 57 that is situated adjacent the light detector 21. The detection light pipe 35 is configured to receive ambient light at its inlet end 55 and to transmit such ambient light therethrough and output the ambient light from its outlet end 57 and into the light detector 21. As such, the light detector 21 and the detection light pipe 35 together work to enable the electronic device 5 to detect the degree to which ambient light exists at the front of the main body 7. As dusk approaches, by way of example, and as the amount of ambient light at the front of the main body 7 decreases, the electronic device 5 advantageously energizes the second illumination source 23 which, in conjunction with the second body 29, provides white light or other-colored illumination in the holster area 58.

More specifically, the second body 29 includes an illumination light pipe 60 that is formed of an at least partially translucent material. The illumination light pipe 60 includes an inlet end 59 that is situated adjacent the second illumination source 23 and further includes an outlet end 61 that is situated adjacent the exterior 13. More particularly, the housing 11 has formed therein a hole 62 in the holster area 58, and the outlet end 61 of the illumination light pipe 60 is received in the hole 62 and thus is situated at the exterior 13 of the housing 11. When the routines on the electronic device 5 determine, based upon input from the light detector 21, that ambient light at the front of the main body 7 has diminished, the second illumination source 23 is energized, thereby generating white LED light. This LED light is received at the inlet end 59 of the illumination light pipe 60 and is transmitted through the illumination light pipe 60 and is output at the outlet end 61 in the holster area 58 and in the vicinity of the charging handle 9. This advantageously enables a user to easily visually identify the charging handle 9 so that the charging handle 9 can be removed from the holster area 58 and put to use in, for instance, charging an electric vehicle.

It thus can be understood that the light pipe apparatus 3 performs a plurality of light-related functions. The indication light pipe 33 provides colored light generally all times at the exterior 13 of the housing 11 in order to provide function-related information to a user, whereas the illumination light pipe 60 provides white light in the holster area 58 in low ambient light conditions, and the detection light pipe 35 communicates ambient light from the exterior 13 to the light detector 21 in order to detect on the electronic device 5 a low ambient light condition. In order to further avoid light from any of the indication light pipe 33, the detection light pipe 35, and the illumination light pipe 60 from being communicated among one another, either from their inlet and outlet ends or from regions therebetween, the shield 31 is advantageously provided to afford an additional degree of blockage of light transmission among the indication light pipe 33, the detection light pipe 35, and the illumination light pipe 60.

Figure 7:
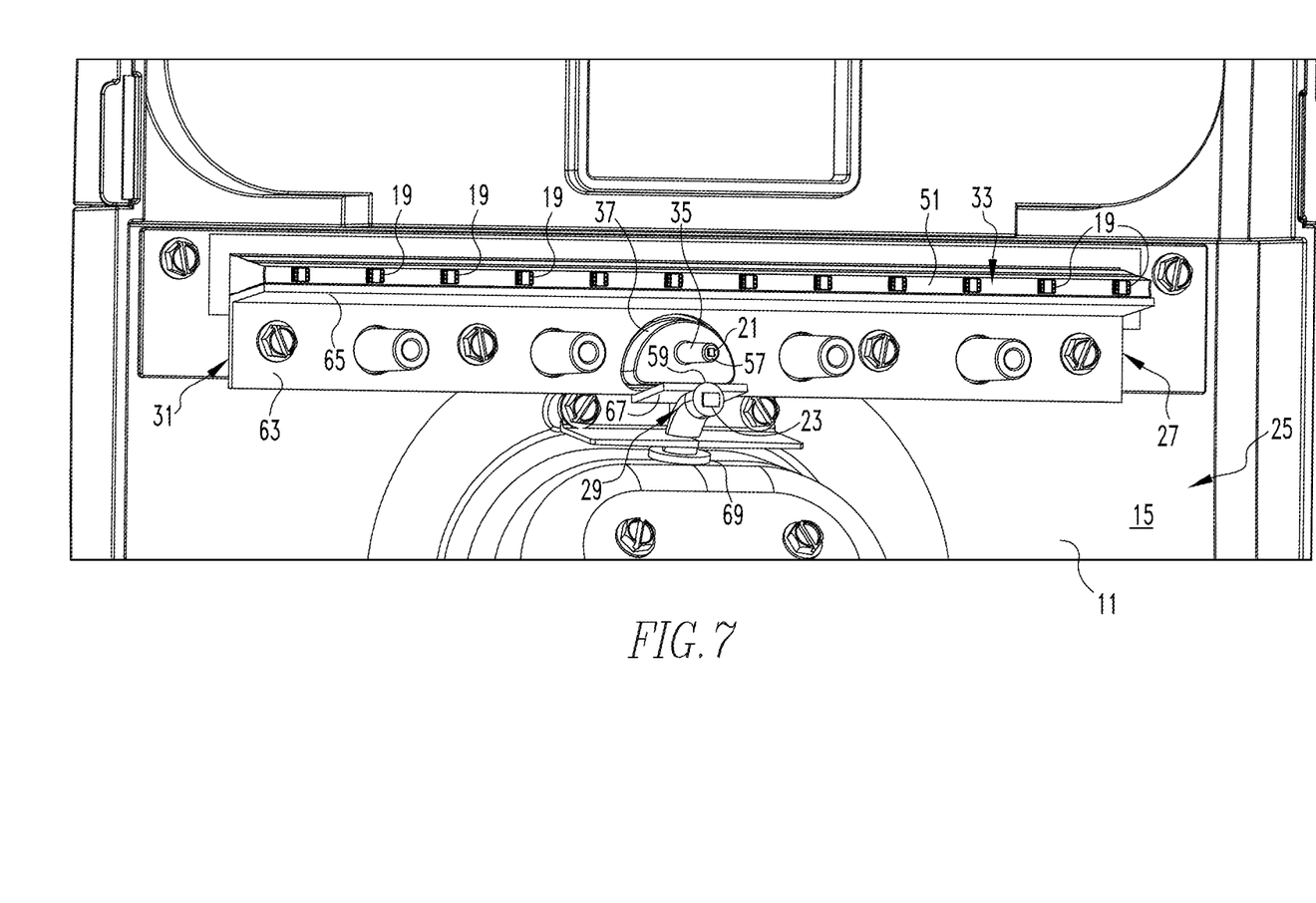
FIG. 7 is a perspective view of a portion of an interior of the housing of the electronic device of FIG. 1.
Figure 8:
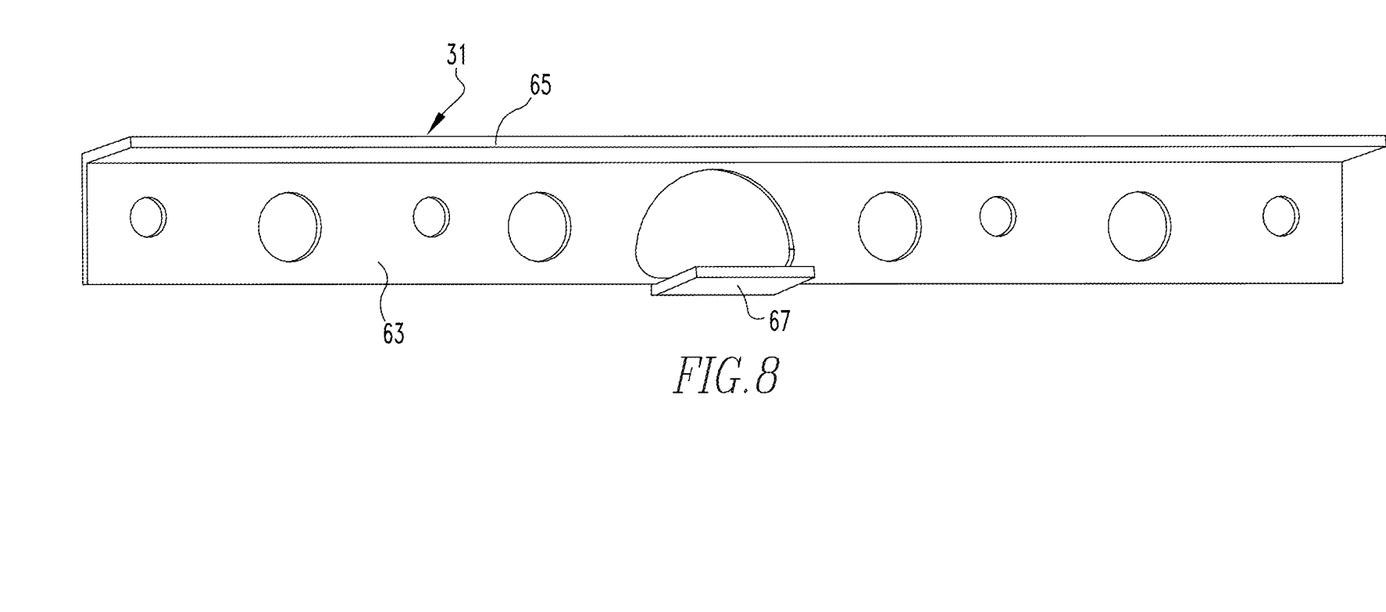
FIG. 8 is perspective view a shield of the light pipe apparatus.

More specifically, and as can be understood from FIGS. 6-8, the shield 31 can be said to include a base 63, a first portion 65 situated on the base 63, and a second portion 67 situated on the base 63 opposite first portion 65. In the depicted exemplary embodiment, the shield 31 is formed of an opaque material, such as fish paper, which is a thin and flexible sheet of opaque material, although other appropriate materials can be employed without departing from the spirit of the instant disclosure. The base 63 is mounted to the housing 11, as can be understood from FIG. 7, and the first and second portions 65 and 67 extend in a common direction away from the base 63. It is understood, however, that in other embodiments the shield 31 could take the form of an opaque coating applied to one or more of the indication light pipe 33, the detection light pipe 35, and the illumination light pipe 60 or alternatively or additionally could be in the form of an opaque tube that is applied on the exterior of, for instance, the detection light pipe 35 and the illumination light pipe 60, by way of example. Other variations will be apparent.

In the depicted exemplary embodiment, the first portion 65 is elongated and extends along the longitudinal extent of the indication light pipe 33 and is interposed between the illumination light pipe 33 and the detection light pipe 35. The second portion 67 is in the form of a tab that is interposed between the detection light pipe 35 and the illumination light pipe 60. It thus can be seen that the first portion 65 blocks light that might exit the indication light pipe 33 at a location between its inlet and outlet ends 51 and 53 from traveling external to the indication light pipe 33 and unintentionally entering either or both of the detection light pipe 35 in the illumination light pipe 60. It also prevents light from the detection light pipe 35 and the illumination light pipe 60 entering the indication light pipe 33 at a location between its inlet and outlet ends 51 and 53. In a like fashion, the second portion 67 blocks light that might exit the illumination light pipe 60 at a location between its inlet and outlet ends 59 and 61 from traveling external to the illumination light pipe 60 and unintentionally entering either or both of the detection light pipe 35 and the indication light pipe 33. It also prevents light from the detection light pipe 35 and the indication light pipe 33 entering the illumination light pipe 60 at a location between its inlet and outlet ends 59 and 61. The shield 31 thus advantageously provides an additional degree of protection against light pollution among the various components of the light pipe apparatus 3, which provides improved functionality.

The light pipe apparatus 3 is further advantageously configured to not require additional seal components to form a number of weather barriers between the exterior 13 and the interior 15, and rather makes use of features provided on the housing 11 and the light pipe apparatus 3 itself to provide such an advantageous weather barrier. More specifically, the illumination light pipe 60 includes a flange 69, such as is shown in FIGS. 6 and 7, that protrudes radially outwardly from the longitudinal extent of the illumination light pipe 60 and that is spaced from the outlet end 61. The flange 69 advantageously engages the housing 11 on an internal surface 71 and the outlet end 61 extends through the hole 62. The engagement of a confronting surface of the flange 69 with the internal surface 71 of the housing 11 creates a weather barrier that resists the ingress of dust, moisture, and the like into the interior 15 through the hole 62. Again, this is accomplished without providing a separate structure beyond the illumination light pipe 60 to form a seal between the illumination light pipe 60 and the housing 11.

Figure 9:
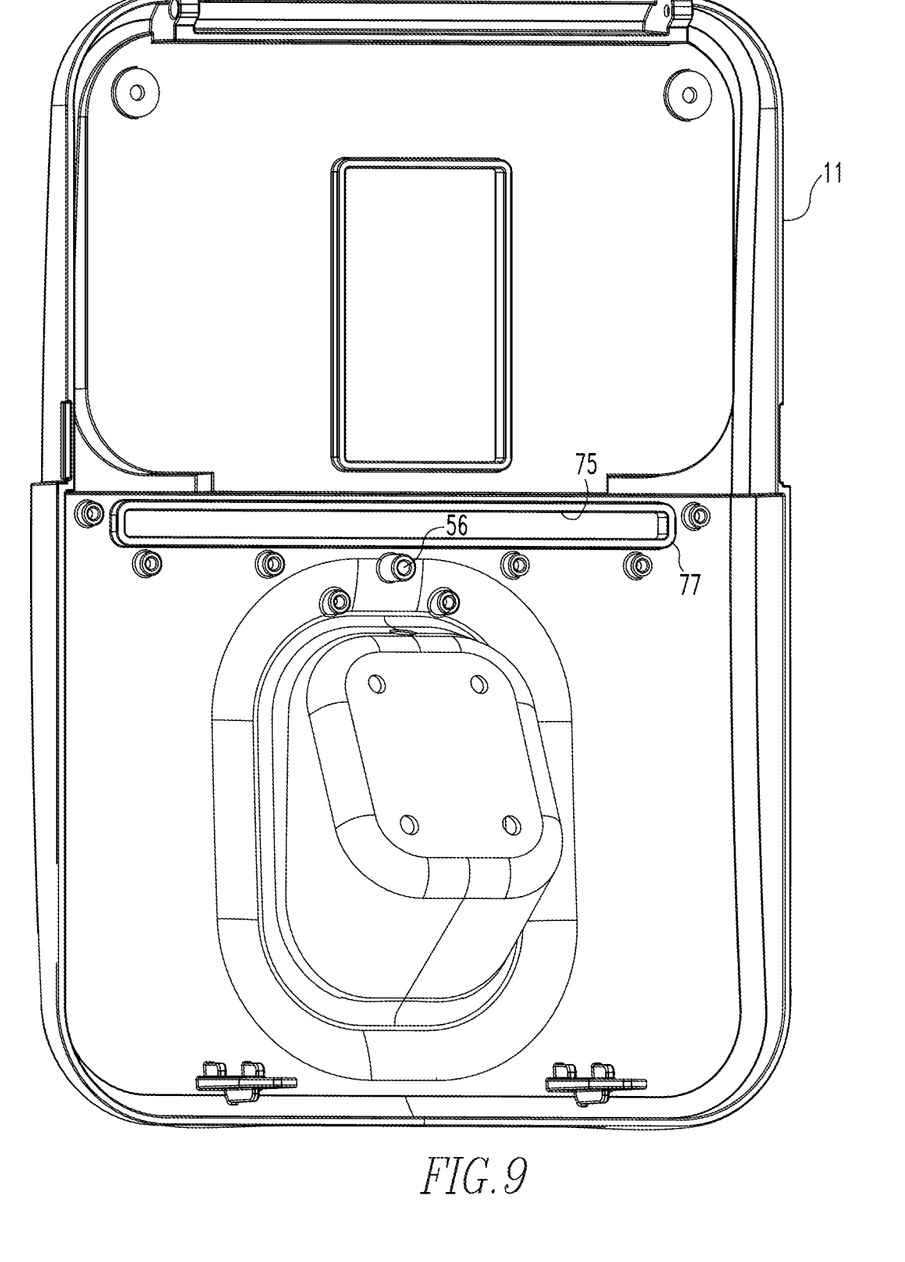
FIG. 9 is another perspective view of another portion of the interior of the housing of the electronic device of FIG. 1.

In a similar fashion, the first body 27 and the housing 11 are configured to themselves provide another weather seal between the exterior 13 and the interior 15 in the vicinity of the indication light pipe 33. More specifically, it can be seen from FIG. 6 that the outlet end 53 of the indication light pipe 33 protrudes through an elongated opening 75 (FIG. 9) that is formed in the housing 11. As can also be seen in FIG. 9, the housing 11 is formed to include a projection 77 that extends about the perimeter of the opening 75 and that protrudes in a direction toward the interior 15. The projection 77 is a single wall that is co-formed with the portion of the housing 11 in which the opening 75 is formed, and the single wall of the projection extends endlessly about the perimeter of the opening 75. It is understood that the projection 77 could be otherwise configured to include a plurality of walls that together form the projection 77.

Figure 10:
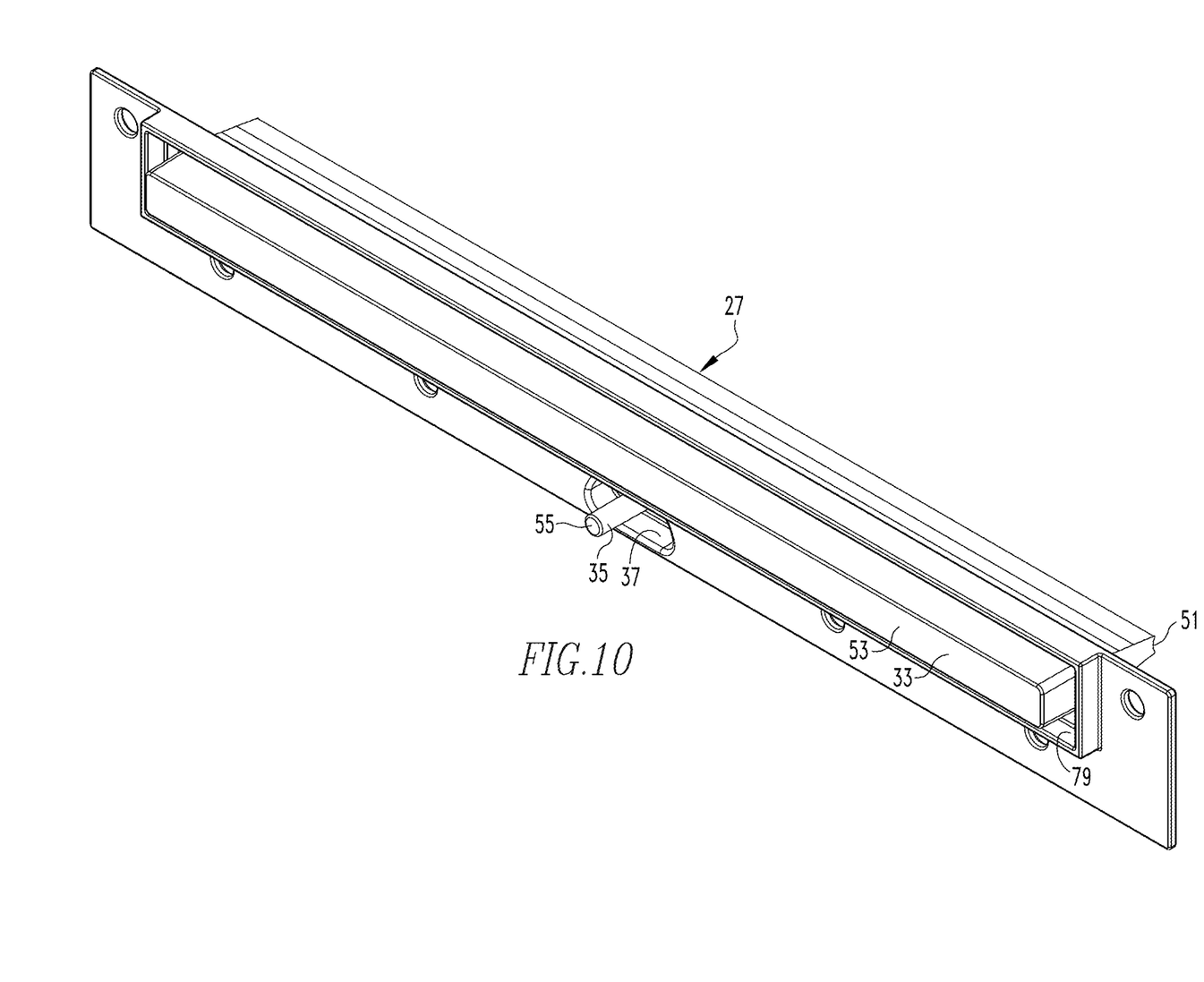
FIG. 10 is another perspective view of the first body.

As can be understood from FIG. 10, the first body 27 is formed to include a receptacle 79 that extends about the perimeter of the indication light pipe 33 in approximately the vicinity of the outlet end 53. When the first body 27 is mounted to the housing 11, such as is depicted generally in FIG. 7, the projection 77 of the housing 11 is received in the receptacle 79 of the first body 27 to form a labyrinth seal 81 between the exterior 13 in the interior 15. The labyrinth seal 81 advantageously resists the ingress of moisture, dust, etc., from the exterior 13 into the interior 15 without requiring the use of additional components other than the first body 27 and the housing 11. Such use of the components, specifically the first body 27 and the housing 11, to form the labyrinth seal 81 reduces the complexity of the electronic device 5 and thus also reduces cost. The weather seals formed by the labyrinth seal 81 and the engagement of the flange 69 with the interior surface 71 advantageously protect the interior 15 from the ingress of moisture, dust, and the like, without adding cost or complexity to the electronic device 5, which is advantageous.

It thus can be seen that the electronic device 5 and the light pipe apparatus 3 advantageously provide the indicated functionality with few components and thus with minimal expense, which is advantageous and desirable. Other damages will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof.

What is claimed is:

1. A light pipe apparatus usable in an electronic device, the electronic device having a housing with an interior and an exterior, a number of illumination sources situated within the interior, and a light detector situated within the interior, the number of illumination sources including an exterior area illumination source, the light pipe apparatus comprising:
    a number of bodies comprising a first body and a second body, the first body being formed as a single piece unit and formed of an at least partially translucent material, the second body being separate from the first body and comprising an illumination light pipe;
    the first body comprising an indication light pipe that is structured to be situated adjacent the number of illumination sources, the indication light pipe including an outlet end that is structured to be situated adjacent the exterior of the housing the indication light pipe being structured to communicate light from the number of illumination sources to the exterior of the housing such that light exiting the outlet end travels in a direction coinciding with the longitudinal extent of the indication light pipe;
    the first body further comprising a detection light pipe that is structured to communicate light from the exterior of the housing to the light detector; and
    a support that extends between the indication light pipe and the detection light pipe, the support comprising a tortuous illumination path that resists the transmission of light between the first light pipe and the second light pipe,
    wherein the detection light pipe includes an inlet end that is structured to be situated adjacent the exterior of the housing,
    wherein the first body and second body are structured to be contained entirely within the interior of the housing,
    wherein the illumination light pipe has an inlet end that is structured to be situated adjacent the exterior area illumination source and an outlet end that is structured to be situated adjacent the exterior of the housing, and
    wherein the illumination light pipe is structured to communicate light from the exterior area illumination source to the exterior of the housing such that light exiting the outlet end of the illumination light pipe travels in a direction orthogonal to the longitudinal extent of the indication light pipe.

2. The light pipe apparatus of claim 1 wherein the support comprises a first leg, a second leg, and an angled connection that is interposed between the first and second legs, the angled connection being structured to resist the transmission of light between the first and second legs.

3. The light pipe apparatus of claim 1 wherein the indication light pipe has an inlet end that is structured to be situated adjacent the number of illumination sources, the indication light pipe being structured to receive at its inlet end light from the number of illumination sources and to output dispersed light from the outlet end.

4. The light pipe apparatus of claim 1 wherein the number of bodies further comprise comprises a shield that resists light transmission into at least one of the indication light pipe and the detection light pipe external to the support.

5. The light pipe apparatus of claim 4 wherein the shield comprises an opaque structure interposed between at least a portion of the indication light pipe and the detection light pipe.

6. The light pipe apparatus of claim 4 wherein the detection light pipe comprises an outlet end that is structured to be situated adjacent the light detector, and wherein the shield comprises at least one of:
    an opaque tube that extends from the outlet end of the detection light pipe in a direction generally toward the light detector;
    an opaque structure interposed between at least a portion of the indication light pipe and the detection light pipe; and
    an opaque coating that is situated on at least a portion of at least one of the indication light pipe and the detection light pipe and that faces generally toward the other of the indication light pipe and the detection light pipe.

7. The light pipe apparatus of claim 1, wherein the number of bodies further comprises a shield that resists light transmission between the light detector and at least one of:
    the exterior area illumination source; and
    at least a portion of the illumination light pipe situated between its inlet and outlet ends.

8. The light pipe apparatus of claim 7 wherein the shield comprises an opaque structure interposed between at least a portion of the illumination light pipe and at least a portion of at least one of the indication light pipe and the detection light pipe.

9. The light pipe apparatus of claim 8 wherein the opaque structure comprises a first portion interposed between the at least portion of the illumination light pipe and the at least portion of the detection light pipe and a second portion interposed between the indication light pipe and the detection light pipe.

10. The light pipe apparatus of claim 7 wherein the shield comprises at least one of:
an opaque tube that extends from the inlet end of the illumination light pipe in a direction generally toward the further illumination source;
an opaque coating that is situated on at least a portion of the illumination light pipe; and
a sheet of opaque material situated on the housing.

11. The light pipe apparatus of claim 1 wherein the illumination light pipe has a flange that protrudes radially outwardly from the longitudinal extent of the illumination light pipe and that is spaced from the outlet end, the flange being structured to engage the housing on a surface thereof opposite the exterior of the housing.

12. An electronic device comprising:
a housing having an interior and an exterior;
a number of illumination sources situated within the interior, the number of Illumination sources including an exterior are illumination source;
a light detector situated within the interior;
a light pipe apparatus comprising a number of bodies, the number of bodies comprising a first body formed as a single piece unit and a second body, the first body being formed of an at least partially translucent material, the second in the first body and comprising an illumination light pipe;
the first body comprising an indication light pipe that is situated adjacent the number of illumination sources, the indication light pipe including an outlet end that is situated adjacent the exterior of the housing, the indication light pipe ag structured to communicate light from the number of illumination sources to the exterior such that light exiting the outlet end travels in a direction coinciding with the longitudinal extent of the indication light pipe;
the first body further comprising a detection light pipe that is structured to communicate light from the exterior of the housing to the light detector; and
a support that extends between the indication light pipe and the detection light pipe, the support comprising a tortuous illumination path that resists the transmission of light between the first light pipe and the second light pipe,
wherein the detection light pipe includes an inlet end that is situated adjacent the exterior of the housing,
wherein the first body and second body are contained entirely within the interior of the housing,
wherein the illumination light pipe has an inlet end that is situated adjacent the exterior area illumination source and an outlet end that is situated adjacent the exterior of the housing, and
wherein the illumination light pipe is structured to communicate light from the exterior area illumination source to the exterior of the housing such that light exiting the outlet end of the illumination light pipe travels in a direction orthogonal to the longitudinal extent of the indication light pipe.

13. The electronic device of claim 12 wherein the number of illumination sources comprise a plurality of illumination sources that are spaced apart from one another, wherein the indication light pipe has an inlet end, the inlet end being elongated and being situated adjacent and extending along the plurality of illumination sources, the housing having an opening that is elongated, at least a portion of the indication light pipe being received in the opening, the outlet end of the indication light pipe being elongated, the first body comprising one of a number of projections and a number of receptacles, the one of a number of projections and a number of receptacles extending parallel with the longitudinal extent of the outlet end, the housing having the other of a number of projections and a number of receptacles, the other of a number of projections and a number of receptacles extending parallel with the longitudinal extent of the opening, the number of projections being received in number of receptacles and forming a labyrinth seal between the exterior and the interior.

14. The electronic device of claim 12 wherein the support comprises a first leg, a second leg, and an angled connection that is interposed between the first and second legs, the angled connection being structured to resist the transmission of light between the first and second legs.

15. The electronic device of claim 12 wherein the indication light pipe has an inlet end that is situated adjacent the number of illumination sources, the indication light pipe being structured to receive at its inlet end light from the number of illumination sources and to output dispersed light from the outlet end.

16. The electronic device of claim 12, wherein the number of bodies further comprises a shield that resists light transmission between the light detector and at least one of:
the exterior area illumination source; and
at least a portion of the illumination light pipe situated between its inlet and outlet ends.

17. The electronic device of claim 16 wherein the shield comprises an opaque structure that comprises a first portion interposed between at least a portion of the illumination light pipe and at least a portion of the detection light pipe and that further comprises a second portion interposed between the indication light pipe and the detection light pipe.

18. The electronic device of claim 17 wherein the shield comprises a sheet of opaque material that is formed as a unitary single piece structure and that is situated on the housing.

* * * * *